United States Patent Office 2,951,063

Patented Aug. 30, 1960

2,951,063

COPOLYMERS OF FLUORINATED DIENES

Archibald N. Bolstad, Maplewood, and Elizabeth Shen Lo, Elizabeth, N.J., assignors, by mesne assignments, to Minnesota Mining and Manufacturing Company, St. Paul, Minn., a corporation of Delaware No Drawing. Filed July 1, 1955, Ser. No. 519,652

5 Claims. (Cl. 260—87.5)

This invention relates to halogen-containing copolymers. In one aspect, the invention relates to fluorine-containing copolymers. More particularly, in this aspect, the invention relates to fluorine-containing elastomeric copolymers and the method for their manufacture.

Fluorine-containing copolymers have been found to possess many useful applications by virtue of their relative chemical inertness and high physical strength and solvent resistance. Because of these properties, such fluorine-containing copolymers can be fabricated into a wide variety of useful articles having improved chemical and physical stability. In this respect, it is also desirable that these fluorine-containing copolymers, in addition to the aforementioned characteristics, also possess elastomeric properties so that a high degree of flexibility, elasticity and extensibility is obtained, and which can be easily vulcanized and processed.

It is, therefore, an object of this invention to provide new and useful fluorine-containing copolymers having desirable chemical and physical characteristics.

Another object of the invention is to provide new and useful fluorine-containing elastomeric copolymers, having the aforementioned characteristics, which can be easily fabricated into a wide variety of useful articles of improved chemical and physical stability.

Still another object of the invention is to provide a method for the preparation of the aforementioned elastomeric fluorine-containing copolymers.

Various other objects and advantages inherent in the present invention will become apparent to those skilled in the art from the accompanying description and disclosure.

The copolymers of the present invention are elastomeric copolymers of fluoroprene (2-fluorobutadiene) and a polymerizable straight-chain diene containing a terminal carbon atom having two fluorine substituents. In general, as more fully hereinafter disclosed, these copolymers are prepared by copolymerizing fluoroprene and the polymerizable straight-chain diene in the presence of a polymerization catalyst at temperatures between about 10° C. and about 75° C., and preferably at a temperature between about 25° C. and about 50° C. The copolymers thus obtained are valuable macromolecules which are adaptable to a number of commercial uses, possessing varying degrees of flexibility, elasticity and resiliency, and which can be easily vulcanized and processed. These copolymers are chemically and thermally stable, resistant to oil and hydrocarbon-fuels, selectively soluble in various organic solvents, and can be molded by conventional techniques to yield a wide variety of useful articles. They are also useful as durable, flexible, protective coatings on surfaces which are subjected to environmental conditions in which they may come into contact with various corrosive substances, for example, oils, fuels and strong chemical reagents.

As indicated above, the fluoroprene monomer is copolymerized with a polymerizable straight-chain diene containing a terminal carbon atom having two fluorine substituents. Examples of these latter polymerizable straight-chain dienes that can be polymerized with the fluoroprene monomer are 1,1,2-trifluorobutadiene; 1,1,3-trifluorobutadiene; 1,1-difluorobutadiene; 1,1,2,4-tetrafluorobutadiene; 1,1,2,4,4-pentafluorobutadiene; and perfluorobutadiene.

The most useful elastomeric copolymers produced in accordance with this invention contain between about 10 mol percent and about 95 mol percent fluoroprene, and the remaining major constituent being any of the aforementioned straight-chain dienes. Copolymers containing between about 30 mol percent and about 70 mol percent fluoroprene are preferred.

The elastomeric copolymers of this invention are prepared by employing a peroxy type catalyst containing the O—O linkage, in the form of either a water-emulsion type recipe or as an organic peroxide promoter in a bulk-type polymerization system. The water-emulsion type recipe system is preferred. The peroxy compound present in these water-emulsion type recipes functions as an oxidant. This oxidant is preferably an inorganic persulfate, such as potassium persulfate, sodium persulfate or ammonium persulfate. There is also present in these water-emulsion type recipes, a reductant which is preferably in the form of a bisulfite, such as potassium bisulfite, sodium bisulfite, potassium metabisulfite, or sodium metabisulfite. The oxidant comprises between about 0.1 and about 5 parts per 100 parts of total monomers present. The reductant, for example, sodium metabisulfite, comprises between about 0.05 and about 5 parts by weight per 100 parts of total monomers present, and preferably comprises between about 0.1 and about 2 parts by weight per 100 parts of total monomers present. It has been found that the presence of such materials as borax, along with the oxidant and the reductant, aid the copolymerization in these water-emulsion type recipes by maintaining the desired pH.

The emulsifying agent, employed in the above-mentioned water-emulsion type recipe systems, is present either in the form of an aliphatic acid metal salt, having from 14 to 20 carbon atoms per molecule or in the form of a halogenated organic acid having from 6 to 18 carbon atoms per molecule. A typical example of these emulsifying agents is potassium stearate (KORR soap). Typical examples of halogenated organic acid emulsifying agents in the above-mentioned recipes are salts derived from fluorocarboxylic acids (e.g., perfluorooctanoic acid) or perfluorochlorocarboxylic acids (e.g., trifluorochloroethylene telomer acid soaps). The fluorocarboxylic acid salts which may be employed are those disclosed in U.S. Patent No. 2,559,752, and the nonacidic derivatives of the acids disclosed therein as being effective dispersing agents in polymerization reactions which may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents comprise between about 0.5 and about 20 parts by weight per 100 parts of total monomers present.

The emulsion polymerization is preferably conducted under alkaline conditions. It is desirable in these emulsion polymerization systems that the pH be maintained within the limits of between about 7 and 11, in order to prevent gelling of the emulsifying agents, a condition which often causes slowdown or stoppage of the polymerization reaction. In this respect, it should be noted that it is sometimes necessary to maintain the pH of the system between the aforementioned pH limits by the addition of suitable buffer reagents. A typical example would be 1 to 4 parts of borax based on 100 parts of water used in the recipe.

As indicated above, the polymerization reactions may also be carried out in which the catalyst is present in the form of an organic peroxide promoter in a bulk-type polymerization system. Of these organic peroxide promoters, halogen-substituted acetyl peroxides are preferably employed. A preferred promoter of this type is trichloroacetyl peroxide. Other halogen-substituted organic peroxides which are suitable for carrying out the copolymerization are trifluorodichloropropionyl peroxide, trifluoroacetyl peroxide, difluoroacetyl peroxide, 2,4-dichlorobenzoyl peroxide, chloroacetyl peroxide, dichlorofluoroacetyl peroxide. The copolymerizations described herein to produce the copolymers of the present invention are carried out under autogenous conditions of pressure. In general, these pressures do not rise above approximately 500 pounds per square inch.

As previously indicated, the elastomeric polymers of the present invention are particularly suitable and useful for the fabrication of a wide variety of rubber-like materials having highly desirable chemical and physical properties. In this respect, the copolymers of the present invention possess important utility in the manufacture of protective articles of clothing, such as boots, suits, gloves, belts and in the fabrication of resilient gaskets, seals, pump and valve-diaphragms, films and other commercial applications.

Another important use of the copolymers of the present invention is in the form of durable, flexible coatings to fabric surfaces. For this purpose, the polymers of this invention may be dissolved in various commercial solvents. Particularly useful solvents comprises the aliphatic and aromatic esters and ketones. Typical examples of these solvents are di-isobutyl ketone, methyl ethyl ketone, methyl isobutyl ketone and ethyl benzoate. In this respect, it is often desirable to reduce the molecular weight of the copolymers of this invention in order to obtain greater solubility in organic solvents. This is of importance in order to vary the softness of the copolymer for easier processability in subsequent molding operations. Reduction of the strength of the recipe of the polymerization catalyst merely slows the rate of reaction without affecting appreciably the molecular weight of the finished copolymer. It is found, however, that the addition of various polymerization modifiers appreciably reduces the molecular weight of the copolymeric products and increases their solubility and ease of processability without affecting, unduly, the overall yield. Suitable polymerization modifiers include chloroform ($CHCl_3$), Freon–113 ($CF_2ClCFCl_2$), carbon tetrachloride ($CCl_4$), trichloroacetyl chloride ($CCl_3COCl$), bromotrichloroethane ($CBrCl_3$), and dodecyl mercaptan ($C_{12}H_{25}SH$). These modifiers are preferably added in amounts between about 0.01 to about 10 parts by weight per 100 parts of total monomers charged to the polymerization reaction. Dodecyl mercaptan is preferred.

The following examples are offered for a better understanding of the present invention and are not to be construed as limiting its scope.

*Example I*

This example illustrates the copolymerization of fluoroprene and 1,1,2-trifluorobutadiene to produce an elastomeric copolymer.

A heavy-walled glass polymerization tube was flushed with nitrogen and then charged with 9 ml. of a soap solution comprising 6 grams of the ammonium salt of perfluorooctanoic acid ($C_7F_{15}COONH_4$), as an emulsifier; 0.4 gram of sodium metabisulfite; 0.5 gram borax; and 0.1 gram dodecyl mercaptan dissolved in 180 ml. of water. The tube was then immersed in a liquid nitrogen freezing bath. When the contents of the tube were frozen solid, 1 ml. of an aqueous solution containing 1.0 gram of potassium persulfate dissolved in 20 ml. of water were added. The contents of the tube were then refrozen, and the tube was then connected to a gas-transfer system and evacuated at liquid nitrogen temperature. To the frozen contents of the tube were added, by distillation, 2.94 grams of 1,1,2-trifluoro-1,3-butadiene and 2.06 grams of fluoroprene, which comprised a 50/50 molar ratio. The 1,1,2-trifluoro-1,3-butadiene monomer was obtained by adding dibromodifluoromethane to 1-fluoropropene to produce the adduct $$CF_2BrCHFCHBrCH_3$$

which upon dehydrobromination yielded $$CF_2{=}CFCHCH_2$$

B.P. 4.8° C.–8.0° C. 1-fluoroprene was prepared by the following series of reactions:

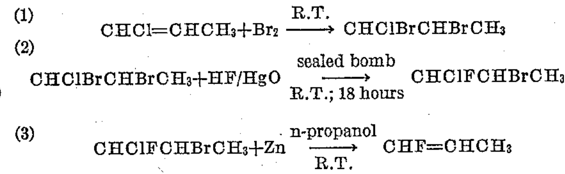

(1) $CHCl{=}CHCH_3 + Br_2 \xrightarrow{R.T.} CHClBrCHBrCH_3$ (2) $CHClBrCHBrCH_3 + HF/HgO \xrightarrow[R.T.;\ 18\ hours]{sealed\ bomb} CHClFCHBrCH_3$ (3) $CHClFCHBrCH_3 + Zn \xrightarrow[R.T.]{n\text{-}propanol} CHF{=}CHCH_3$ The 1,1,2-trifluoro-1,3-butadiene monomer can also be prepared by such procedure as is disclosed in the Journal of the American Chemical Society, vol. 77, page 2786 (May 20, 1955).

The polymerization tube was sealed and rotated end-over-end in a temperature-regulated bath at 50° C. under autogenous pressure for a period of 22 hours. At then end of this time, the contents of the tube were coagulated by freezing at liquid nitrogen temperature. The coagulated product was then removed from the tube, washed with hot water until entirely free of soap and dried to constant weight in vacuo at 35° C. An extensible rubbery copolymer was obtained and then found, upon analysis, to comprise approximately 58 mol percent fluoroprene and the remaining major constituent being 1,1,2-trifluoro-1,3-butadiene. The copolymer was obtained in an amount representing a 100% conversion.

*Example II*

This example illustrates the copolymerization of fluoroprene and 1,1,3-trifluorobutadiene to produce an elastomeric copolymer.

A heavy-walled glass polymerization tube was flushed with nitrogen and then charged with 7 ml. of a soap solution containing the potassium salt of perchlorofluorooctanoic acid (0.75 gram), dissolved in 140 ml. of water, and prepared in accordance with the process disclosed in co-pending application Serial No. 501,782, filed April 18, 1955. The pH of the system was adjusted with potassium hydroxide to 7.0. The contents of the tube were then frozen in a liquid nitrogen bath, and to the tube were then added 3 ml. of a catalyst solution containing potassium persulfate (1.0 gram) dissolved in 60 ml. of water. The contents of the tube were then refrozen, and the tube was then connected to a gas-transfer system and evacuated at liquid nitrogen temperature. To the frozen contents of the tube were added, by distillation, 3 grams of 1,1,3-trifluoro-1,3-butadiene and 2 grams of fluoroprene, which comprised a 50/50 molar ratio. The 1,1,3-trifluoro-1,3-butadiene monomer was obtained by adding dibromodifluoromethane to 2-fluoropropene to produce the adduct $$CF_2BrCH_2CFBrCH_3$$

which was then dehydrobrominated at about 150° C. using tri-n-butyl amine to yield $CF_2{=}CH{-}CF{=}CH_2$, B.P. 17.5° C.–19.5° C. 2-fluoropropene was prepared by the following series of reactions:

(1) $CH_2ClCHClCH_3 + KOH \rightarrow CH_2{=}CClCH_3 + CHCl{=}CHCH_3$ (2) $CH_2{=}CClCH_3 + HF \rightarrow CH_3CFClCH_3$

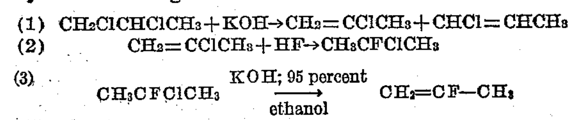

(3) $CH_3CFClCH_3 \xrightarrow[ethanol]{KOH;\ 95\ percent} CH_2{=}CF{-}CH_3$

The 1,1,3-trifluoro-1,3-butadiene monomer can also be prepared by such procedure as is disclosed in the Journal of the American Chemical Society, vol. 77, page 2786 (May 20, 1955).

The polymerization tube was sealed and rotated end-over-end in a temperature-regulated water-bath at 50° C. under autogenous pressure for a period of 25 hours. At the end of this time, the contents of the tube were coagulated by freezing at liquid nitrogen temperature. The coagulated product was then removed from the tube, washed with hot water until entirely free of soap and dried to constant weight in vacuo at 35° C. An extensible rubbery copolymer was obtained and then found, upon analysis, to comprise approximately 73.5 mol percent of fluoroprene and the remaining major constituent 1,1,3-trifluoro-1,3-butadiene. The copolymer was obtained in an amount representing a 19% conversion.

*Example III*

This example illustrates the copolymerization of fluoroprene and 1,1-difluorobutadiene to produce an elastomeric copolymer.

A heavy-walled glass polymerization tube was flushed with nitrogen and then charged with 9 ml. of a soap solution comprising 6 grams of the ammonium salt of perfluorooctanoic acid ($C_7F_{15}COONH_4$), as an emulsifier; 0.4 gram of sodium metabisulfite; 0.5 gram borax; and 0.01 gram of dodecyl peroxide, dissolved in 180 ml. of water. The tube was then immersed in a liquid nitrogen freezing bath. When the contents of the tube were frozen solid, 1 ml. of an aqueous solution containing 1.0 gram of potassium persulfate in 20 ml. of water were added. The contents of the tube were then refrozen and the tube was then connected to a gas-transfer system and evacuated at liquid nitrogen temperature. To the frozen contents of the tube were added, by distillation, 2.22 grams of 1,1-difluorobutadiene and 2.78 grams of fluoroprene, which comprised a 50/50 molar ratio.

The polymerization tube was sealed and rotated end-over-end in a temperature-regulated water-bath at 50° C. under autogenous pressure for a period of 25 hours. At the end of this time, the contents of the tube were coagulated by freezing at liquid nitrogen temperature. The coagulated product was then removed from the tube, washed with hot water until entirely free of soap and dried to constant weight in vacuo at 35° C. An extensible rubbery copolymer was obtained and then found, upon analysis, to comprise approximately 94 mol percent fluoroprene and the remaining major constituent being 1,1-difluorobutadiene. The copolymer was obtained in an amount representing a 12% conversion.

*Example IV*

This example illustrates the copolymerization of fluoroprene and 1,1,2,4-tetrafluorobutadiene.

A heavy-walled glass polymerization tube was flushed with nitrogen and then charged with 1 ml. of a solution containing 0.4 gram of sodium metabisulfite dissolved in 20 ml. of water. The contents of the tube were then frozen and to the tube were added 7.5 ml. of a soap solution containing the potassium salt of perfluorooctanoic acid (0.75 gram) dissolved in 150 ml. of water. The pH of the resulting mixture was adjusted with potassium hydroxide to 7. The tube was then refrozen and to it was charged 1.5 ml. of a catalyst solution containing 1.0 gram of potassium persulfate dissolved in 30 ml. of water. The tube was then connected to a gas-transfer system and evacuated at liquid nitrogen temperatures. To the frozen contents of the tube were added 3.08 grams of 1,1,2,4-tetrafluorobutadiene and 1.92 grams of fluoroprene, which comprised a 50/50 molar ratio.

The polymerization tube was sealed and rotated end-over-end in a temperature-regulated water-bath at 50° C. under autogenous pressure for a period of 25 hours. At the end of this time, the contents of the tube were coagulated by freezing at liquid nitrogen temperature. The coagulated product was then removed from the tube, washed with hot water until entirely free of soap and dried to constant weight in vacuo at 35° C. An extensible rubbery copolymer was obtained and then found, upon analysis, to comprise approximately 53 mol percent fluoroprene and the remaining major constituent being 1,1,2,4-tetrafluorobutadiene. The copolymer was obtained in an amount representing a 72% conversion.

*Example V*

This example illustrates the copolymerization of fluoroprene and 1,1,2,4,4-pentafluorobutadiene to produce an elastomeric copolymer.

A heavy-walled glass polymerization tube was flushed with nitrogen and then charged with 9 ml. of a soap solution comprising 6 grams of the ammonium salt of perfluorooctanoic acid ($C_7F_{15}COONH_4$), as an emulsifier; 0.4 gram of sodium metabisulfite; 0.5 gram of borax; and 0.1 gram dodecyl mercaptan dissolved in 180 ml. of water. The tube was then immersed in a liquid nitrogen freezing bath. When the contents of the tube were frozen solid, 1 ml. of an aqueous solution containing 1.0 gram of potassium persulfate in 20 ml. of solution were added. The contents of the tube were then refrozen, and the tube was then connected to a gas-transfer system and evacuated at liquid nitrogen temperature. To the frozen contents of the tube were added, by distillation, 3.34 grams of 1,1,2,4,4-pentafluorobutadiene and 1.66 grams of fluoroprene, which comprises a 50/50 molar ratio. The 1,1,2,4,4-pentafluorobutadiene was prepared as follows: 1-chloro-1,2-dibromo-1,2,2-trifluoroethane, $CF_2BrCFClBr$, was added to vinylidene fluoride to yield $CF_2BrCFClCH_2CF_2Br$, which was then dehydrobrominated using potassium hydroxide, followed by debromochlorination using zinc to yield

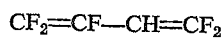

$$CF_2{=}CF{-}CH{=}CF_2$$

B.P. 15.0° C.–15.5° C.

The polymerization tube was sealed and rotated end-over-end in a temperature-regulated bath at 50° C. under autogenous pressure for a period of 24 hours. At the end of this time, the contents of the tube were coagulated by freezing at liquid nitrogen temperature. The coagulated product was then removed from the tube, washed with hot water until entirely free of soap and dried to constant weight in vacuo at 35° C. An extensible rubbery copolymer was obtained and then found, upon analysis, to comprise approximately 66 mol percent fluoroprene and the remaining major constituent being 1,1,2,4,4-pentafluorobutadiene. The copolymer was obtained in an amount representing a 20% conversion.

*Example VI*

This example illustrates the copolymerization of fluoroprene and perfluorobutadiene to produce an elastomeric copolymer.

A heavy-walled glass polymerization tube was flushed with nitrogen and then charged with 1 ml. of a solution comprised of 0.4 gram of sodium metabisulfite dissolved in 20 ml. of water. The contents of the tube were then frozen and the tube was then charged with 5 ml. of a soap solution comprising 5.0 grams of potassium stearate (KORR soap), 0.5 gram borax, and 0.2 gram of dodecyl mercaptan in 150 cc. of water. The pH of the system was then adjusted to 10.0. The contents of the tube were next refrozen in liquid nitrogen and the tube was then charged with 4 ml. of a catalyst solution comprised of 1 gram of potassium persulfate dissolved in 30 ml. of water. The tube was next connected to a gas-transfer system and evacuated at liquid nitrogen temperature. To the frozen contents of the tube were added, by distillation, 3.46 grams of perfluorobutadiene and 1.54 grams of fluoroprene, which comprised a 50/50 molar ratio, The polymerization tube was sealed and rotated end-over-end in a temperature regulated bath at 50° C. under autogenous pressure for a period of 24 hours. At the end of this time, the contents of the tube were coagulated by freezing at liquid nitrogen temperature. The coagulated product was then removed from the tube, washed with hot water until entirely free of soap and dried to constant weight in vacuo at 35° C. An extensible rubbery copolymer was obtained and then found, upon analysis, to comprise approximately 81% fluoroprene and the remaining major constituent being perfluorobutadiene. The copolymer was obtained in an amount representing a 72% conversion.

As previously indicated, the elastomeric copolymers of the present invention possess highly desirable chemical and physical properties which makes them useful for the fabrication of a wide variety of rubber-like articles or for application to various surfaces as protective coatings. In such cases, the raw elastomeric copolymer can be pressed into sheets at temperatures between about 250° F. and about 350° F., and at a pressure between about 500 and about 1500 pounds per square inch, for a period of about 10 to about 60 minutes, from which various articles, such as gaskets, diaphragms, etc., may be fabricated. In this respect, it should be noted that the raw copolymer may also include various vulcanizing agents and fillers, if so desired.

When employed as protective coatings on any of the surfaces previously described, the raw elastomeric copolymer is dissolved in any of the aforementioned solvents, and is applied to the desired surface employing such apparatus as a knife spreader or a doctor-blade or a reverse-roll coater. The solvent, after the elastomeric coating composition has been applied to the surface, is permitted to evaporate. This may also be accomplished in the presence of elevated temperatures. After the solvent has been completely evaporated, the coated surface is now ready for use. In this respect, it should also be noted that the copolymeric coating composition may be applied to the surface either as a single coat, or if so desired, the protective coating may be built-up by the application of several layers, each layer being permitted to harden by solvent evaporation before the next layer is applied. Furthermore, if so desired, the protective coatings, or the elastomeric copolymer when obtained in the form of sheets, may be suitably pigmented.

Since certain changes may be made in carrying out the process of the present invention in producing the desired elastomeric copolymers without departing from the scope of the invention, it is intended that all matter contained in the above description is to be interpreted as illustrative and not in a limiting sense.

We claim:

1. An elastomeric copolymer of between about 53 and about 94 mol percent of fluoroprene and correspondingly between about 47 and about 6 mol percent of a fluorinated butadiene selected from the group consisting of 1,1,2-trifluorobutadiene, 1,1,2,4-tetrafluorobutadiene, 1,1-2,4,4-pentafluorobutadiene, and perfluorobutadiene.

2. An elastomeric copolymer of between azout 53 and about 94 mol percent of fluoroprene and correspondingly between about 47 and about 6 mol percent of 1,1,2-trifluorobutadiene.

3. An elastomeric copolymer of between about 53 and about 94 mol percent of fluoroprene and correspondingly between about 47 and about 6 mol percent of 1,1,2,4-tetrafluorobutadiene.

4. An elastomeric copolymer of between about 53 and about 94 mol percent of fluoroprene and correspondingly between about 47 and about 6 mol percent of 1,1,2,4,4-pentafluorobutadiene.

5. An elastomeric copolymer of between about 53 and about 94 mol percent of fluoroprene and correspondingly between about 47 and about 6 mol percent of perfluorobutadiene.

References Cited in the file of this patent

UNITED STATES PATENTS

| | | |
|---|---|---|
| 2,446,382 | Mochel | Aug. 3, 1948 |
| 2,479,367 | Joyce et al. | Aug. 16, 1949 |
| 2,742,454 | Rearick et al. | Apr. 17, 1956 |
| 2,750,431 | Tarrant et al. | June 12, 1956 |

OTHER REFERENCES

I. & E.C., vol. 40, pages 2285–2289, December 1948.